United States Patent
Williams

(10) Patent No.: US 6,740,705 B2
(45) Date of Patent: May 25, 2004

(54) PROCESS FOR MAKING POLY (URETHANE-UREA)/ADDITION POLYMER COMPOSITE PARTICLES

(75) Inventor: Neal St. John Williams, Warfield (GB)

(73) Assignee: Imperial Chemical Industries plc (GB)

( * ) Notice: Subject to any disclaimer, the term of this patent is extended or adjusted under 35 U.S.C. 154(b) by 461 days.

(21) Appl. No.: 09/907,646

(22) Filed: Jul. 19, 2001

(65) Prior Publication Data

US 2002/0058751 A1 May 16, 2002

Related U.S. Application Data

(63) Continuation-in-part of application No. 09/669,038, filed on Sep. 25, 2000.

(30) Foreign Application Priority Data

Jun. 17, 2001 (GB) .............................................. 0014762

(51) Int. Cl.$^7$ .................................................. C08K 3/00
(52) U.S. Cl. ........................ 524/591; 524/589; 524/590
(58) Field of Search ................................ 524/589, 590, 524/591

(56) References Cited

U.S. PATENT DOCUMENTS 4,644,030 A  2/1987  Loewrigkeit et al.
5,872,182 A  2/1999  Duan et al.

FOREIGN PATENT DOCUMENTS

JP  04 185645 A  7/1992
JP  10 338 732 A  12/1998

*Primary Examiner*—Edward J. Cain
(74) *Attorney, Agent, or Firm*—Kenneth J. Stachel

(57) ABSTRACT

A process for making poly(urethane-urea)/addition polymer composite particles which avoids the need to use a highly viscous solution of a prepolymer for the poly(urethane-urea). The process comprises dissolving diol and di-isocyanate in addition polymerisable monomers and allowing them to co-react but for only long enough to form a precursor for the prepolymer which is of a lower molecular weight than the prepolymer so that the precursor forms a solution of much lower viscosity. This lower viscosity solution is then dispersed in water to give droplets in which the co-reaction continues and completes the formation of the prepolymer whilst water diffuses into the droplets and causes chain extension to create the poly(urethane-urea) particles. The addition polymerisable monomers in the dispersed droplets spontaneously diffuse into the poly (urethane-urea) particles where they are subjected to a conventional free radical addition polymerisation process whereupon composite the poly(urethane-urea)/addition polymer particles are formed. The composite particles can be obtained as stable aqueous dispersions optionally containing less than 3 wt % organic solvent and over 40 wt % of the composite particles.

14 Claims, 2 Drawing Sheets

Solvent: N-methyl pyrrolidone

Conventional
Polyurethane prepolymer
dissolved in organic solvent.

PROCESS FOR MAKING POLY (URETHANE-UREA)/ADDITION POLYMER COMPOSITE PARTICLES

This Application is a Continuation in Part of U.S. patent application Ser. No. 09/669,038 filed on Sep. 25, 2000.

This invention relates to a process for making poly (urethane-urea)/addition polymer composite particles without the need to handle viscous materials and to a process for making optionally solvent-free aqueous dispersions of the composite particles. The composite particles have outer regions which contain poly(urethane-urea) optionally carrying some ionic carboxylate groups and inner regions which contain addition polymer. Commercial polyurethanes additionally contain important urea moieties and so the term "poly(urethane-urea)" is used in this specification to take account of that fact. Addition polymers are polymers (including copolymers) derivable from the free radical addition polymerisation of ethylenically unsaturated relatively hydrophobic monomers such as acrylic (including methacrylic) esters, vinyl esters, (usually vinyl carboxylates) or styrene. In addition the invention relates to and to aqueous coating compositions and adhesives formulations containing the composite particles. Nowadays, environmental concerns increasingly demand minimisation or preferably total avoidance of organic solvent in aqueous dispersions of particles of this type. Organic solvent free dispersions would be useful in adhesives formulations and in coating compositions for wood, concrete, plaster, glass fiber and plastics surfaces of the type found in buildings and metal surfaces of the type found in motor vehicles.

United States Patent Specification U.S. Pat. No. 4,644,030 (published in 1987) describes a technique for making poly(urethane/urea)/addition polymer composite particles in which a high molecular weight polyurethane prepolymer is first made by dissolving diol and di-isocyanate in addition polymerisable hydrophobic monomers acting as a hydrophobic volatile organic solvent whereupon the diol and di-isocyanate react together exothermically to form a viscous solution of high molecular weight prepolymer in the hydrophobic monomer. After formation of the prepolymer has been completed, the solution of prepolymer in hydrophobic monomer is dipersed as fine droplets in water. The prepolymer in the droplets is chain extended to make poly(urethane-urea) and the addition polymerisable monomers are subjected to addition polymerisation to make addition polymer and the two come together to form poly (urethane-urea) composite particles.

There are two problems with the technique of U.S. Pat. No. 4,644,030. The first is that the intrinsic viscosity of the prepolymer in the monomer is high and so either there will be difficulties in shearing the solution into fine droplets on dispersion into the water or this stage of the process will be limited to operation at high temperatures and/or low concentrations of prepolymer. Ideally, the viscosity of the prepolymer/monomer solution should be well below 1 Pascal-sec at room temperature (say 18° C.). The second problem is that the reaction between the diol and di-isocyanate is exothermic and so there is a risk that a premature addition polymerisation of the addition polymerisable monomers could be triggered in a local hot spot, especially if the solution has to be hot to keep its viscosity low.

A widely used commercial alternative process to that of U.S. Pat. No. 4,644,030 resorts to the use of solutions of prepolymer in hot potent unpolymerisable organic solvents which solvents of necessity have unpleasant characteristics.

A typical commercial process employing potent solvents begins with a reaction of aliphatic di-isocyanates (even though they are more expensive than their aromatic analogues) with dimethylol propionic acid (which is also costly) to produce the polyurethane prepolymer dissolved in the organic solvent. The solvent must be aprotic so as to be inert to the isocyanate and it also has to be miscible with water which in practice leads to the choice of N-methyl pyrrolidone even though it is a skin and eye irritant. In addition, the process uses triethylamine as a neutralising base even

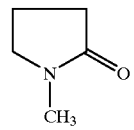

N-methyl pyrrolidone though it is pungent and malodorous and it also uses hydrazine as a chain extender even though it is carcinogenic. Use of all these substances needs specialist handling techniques and so the process cannot be performed in the conventional plants used in the production of polymer latexes by the addition polymerisation of ethylenically unsaturated monomers. Briefly a typical current process is as follows:

Aliphatic di-isocyanate monomers dissolved in N-methyl pyrrolidone are reacted in organic solvent with dimethylol propionic acid and usually other diols to form a low viscosity solution of polyurethane prepolymer carrying carboxylic acid groups. An approximate reaction scheme is shown in FIG. 1 of the drawings where R represents a polymethylene chain (for example ethylene) and where any reactions involving diols other than dimethylol propionic acid have been omitted for simplicity.

The carboxylic acid groups are next neutralised by triethylamine so as to provide the ionic carboxylate groups needed for making a stable dispersion in water.

The neutralised solution is added to water with vigorous agitation whereupon the prepolymer particles become stably dispersed in the water/N-methyl pyrrolidone mixture.

Next the polyurethane prepolymer is chain extended in the presence of the water by adding a diamine (for example hydrazine) to the aqueous dispersion so as to produce urea moieties. An approximate reaction scheme is shown in FIG. 2 of the drawings. Urea moieties usually improve the resistance to organic solvents and also improve the hardness of the poly(urethane-urea).

The product of the chain extension reaction is an aqueous dispersion of solvent-swollen poly(urethane-urea) particles in water containing unpleasant residual organic solvent. Therefore the low viscosity solution of prepolymer in the potent organic solvent is only obtained at the cost of an aqueous dispersion contaminated with the organic solvent.

In a last stage of the process, acrylic hydrophobic monomer is fed with vigorous stirring into the aqueous dispersion of swollen poly(urethane-urea) particles where it diffuses into the swollen particles. The diffused monomer is subjected to addition polymerisation initiated by free radicals (which also diffuse into the swollen particles) whereupon acrylic addition polymer is produced. The acrylic polymer is hydrophobic whereas the poly(urethane-urea) is hydrophilic owing to its ionic carboxylate and urea groups. This difference in hydrophobic/hydrophilic character causes the poly (urethane-urea) spontaneously to encapsulate the particles of acrylic polymer so forming a composite particle which has a core/shell structure and which is stably dispersed in water, albeit water contaminated with usually at least 3 wt % and often up to 10 wt % of unpleasant and environmentally undesirable residual organic liquid.

In order to be able to form stable aqueous dispersions, existing commercial particles need to have a large number of ionic carboxylate groups carried by their poly(urethane-urea) polymer. Usually this large number equates to a notional acid value of around 30 mgKOH/g polyurethane/urea content of the composite particles. By "notional acid value" is meant the acid value which the particles would have if their ionic carboxylate groups were converted to carboxylic acid groups. Such large numbers of ionic carboxylate groups are undesirable for two reasons. Firstly, they adversely alter the nature of the compositions into which the particles are formulated and in particular they may impart excessive water-sensitivity. Secondly, the large numbers of ionic carboxylate groups interact with the water and organic solvent in an aqueous dispersion to cause swelling of the particles and a consequent increased viscosity of the aqueous dispersion. For this reason, it is not possible to obtain useful aqueous dispersions of such particles containing more than at best 40 wt % of the highly carboxylated particles and usually the particle contents are only about 30 wt %.

The process uses aliphatic di-isocyanates even though most of their aromatic analogues are much cheaper. The aromatic di-isocyanates are seldom used because they react with water about ten times more quickly than their more expensive aliphatic analogues. It is found that the rate of reaction of water with the aliphatics is slow enough to be tolerable whereas the cheaper aromatic di-isocyanates react so vigorously that they compete too strongly with the diamine chain extension and they also create exothermic conditions leading to foaming (due to the evolution of carbon dioxide) which is difficult to control in a commercial process. The problems arising from the high rate of reaction of aromatic isocyanates with water are aggravated by the fact that the reaction is catalysed by the presence of the triethylamine. Hence the commercial practice rarely uses aromatic di-isocyanates.

The current commercial process also needs to use expensive acid diols such as dimethylol alkanoic acids. The reason for this is that an acid diol is the only commercially practicable method for introducing carboxylic acid groups into the polyurethane prepolymer. However there is a problem in that sterically unhindered carboxylic acid groups compete too vigorously for the isocyanate groups. Therefore the carboxylic acid group must be sterically hindered and the only commercially practicable acid diols which also offer such sterically hindered carboxylic acid groups are the expensive dimethylol propionic acid and its even more expensive butanoic analogue.

N-methyl pyrrolidone is chosen for use as a solvent because it is the least unpleasant of the small range of commercially acceptable aprotic water-miscible organic solvents able to dissolve the prepolymer and give a solution having a viscosity low enough to be handleable and to be dispersible as fine droplets. Even solutions in N-methyl pyrrolidone need special handling techniques and could not be used in a conventional commercial plant for making latexes by the addition polymerisation of ethylenic monomers.

Triethylamine is used as a neutralising agent for the carboxylic acid because it is the best of the commercially practicable volatile bases which are also non-reactive with isocyanate yet strong enough to resist displacement from the salts they form with the ionic carboxylate groups.

Hydrazine is chosen (even though it is carcenogenic) because it reacts with the isocyanate more quickly than water and it does not displace the triethylamine from its carboxylates. It may also be used to increase the hardness of the poly(urethane-urea) if this is required.

Despite their cost and the use of toxic or unpleasant materials in their manufacture, poly(urethane-urea)/acrylic core/shell composite particles are in demand for high quality coating compositions for wood, metal, concrete, glass fibers and certain plastics and in high performance adhesives compositions. They give dried coating compositions a highly valued resistance to abrasion, scratching and organic solvents combined with a good balance of flexibility with hardness and they give dried adhesives compositions a good balance between adhesion and peel strength.

One object of this invention is to avoid highly viscous solutions of polyurethane prepolymers or alternatively to avoid the need to use hot solutions of prepolymer in potent organic solvents or very dilute solutions of prepolymer in large volumes of solvent. Avoidance of these measures allows the process (if required) to be performed in conventional plant used in the commercial manufacture of polymer latexes by the addition polymerisation of ethylenic monomers. An alternative object is to provide a new process for making poly(urethane-urea)/addition polymer composite particles which avoids the need for diamine chain extension or the need to use dimethylol propionic acid, N-methyl pyrrolidone or triethylamine and which allows the production of aqueous dispersions containing over 40 wt % of the particles and less than 3 wt % (preferably 0 wt %) of organic solvent.

A further alternative object of this invention is to provide poly(urethane-urea)/addition polymer composite particles which can give aqueous coating compositions or adhesives formulations which are comparable in performance with currently available compositions or formulations but without the need for the particles to carry large numbers of ionic carboxylate groups and preferably none at all. In effect this means that the particles have a low notional acid value of below 30 mg KOH/g of the poly(urethane-urea) content of the composite particles and preferably they should not have any significant notional acid value at all, say less than 5 mg KOH/g. It is also an alternative object to avoid aqueous dispersions contaminated with significant amounts (e.g. more than 3 wt %) of residual organic solvent.

Accordingly this invention provides a process for making poly(urethane-urea)/addition polymer composite particles which may optionally carry some ionic carboxylate groups, which process involves a) dissolving diol and di-isocyanate in addition polymerisable hydrophobic monomer to form a hydrophobic solution in which the diol and di-isocyanate begin to co-react, b) dispersing the hydrophobic solution in water containing surfactant so as to form a dispersion of droplets of the hydrophobic solution in the water, c) forming polyurethane-urea by chain extension of a prepolymer which has been formed by co-reaction of the diol and the di-isocyanate, d) subjecting the dispersed droplets of the hydrophobic solution to an addition polymerisation in which the addition polymerisable monomers polymerise to form domains of addition polymer around which poly(urethane-urea) spontaneously locates wherein the process also includes e) dispersing the hydrophobic solution in water before completion of the co-reaction of diol and di-isocyanate whereby there is formed in the hydrophobic monomer prior to dispersion only a precursor for the prepolymer which precursor has a molecular weight lower than that of the prepolymer, f) continuing the co-reaction of diol and di-isocyanate in the dispersed droplets of the hydrophobic solution so as to convert the precursor to prepolymer and g) allowing water to diffuse spontaneously into the dispersed droplets whereupon chain extension occurs producing poly(urethane-urea)

whereby there is obtained a stable aqueous dispersion of the polyurethane-urea/addition polymer particles having a notional acid value of less than 30 mg KOH/g of the poly(urethane-urea) content of the particles.

The dispersion of the hydrophobic solution in water before completion of the co-reaction of the diol and di-isocyanate that the viscosity of the hydrophobic solution just prior to dispersion in water remains low enough to be easily handleable and convertable to fine droplets even at room temperatures and high concentrations of precursor. It has been found that the co-reaction of diol and di-isocyanate continues efficiently in the dispersed droplets despite the presence of water and so the formation of the prepolymer is completed in the droplets which remain easily handleable because they are stably dispersed in the water. Surprisingly, it appears that the presence of the ethylenic unsaturation may help to stabilise the aqueous dispersion of the droplets of the hydrophobic solution.

Preferably the dispersion of the hydrophobic solution in the water is performed before the weight average molecular weight of the precursor has become more than 80% (preferably 65%) of that of the prepolymer. Limitation of the molecular weight of the precursor is necessary to achieve hydrophobic solutions which just prior to dispersion in water have viscosities (if measured at room temperature, say 18° C.) of below 1 Pascal-sec and preferably below 0.7 Pascal.sec. The low viscosity of the solution of precursor in hydrophobic solvent means that it is sufficiently easy to store and pump and disperse in water to allow the process to be easily accommodated on conventional commercial plants used for making polymer latexes by the addition polymerisation of acrylic, vinyl or similar monomers.

Using the process of this invention, it is possible to obtain a stable aqueous dispersion of the poly(urethane-urea) particles having a notional acid value of less than 30 mgKOH/g of the poly(urethane-urea) content of the composite particles and preferably less than 5 mgKOH/g. Substantially zero notional acid values are easily attainable since it has been discovered that when particles are made by the process of this invention, there is no need of carboxylate groups derived from acid diols to enable the composite particles to form stable aqueous dispersions. The low levels or absence of carboxylate groups combined with very low levels or absence of organic solvents enables the aqueous dispersions to contain over 40 wt % of particles based on the total weight of the dispersion without creating an excessively viscous aqueous dispersion. For commercial purposes, the dispersion will usually contain between 45 to 50 wt % of the composite particles.

The process is able to use aromatic di-isocyanates and to avoid the use of expensive acid diols or unpleasant materials such as N-methyl pyrrolidone, triethylamine and hydrazine. Preferably diol is added first to the hydrophobic solvent followed by di-isocyanate. The addition is performed with stirring and preferably at ambient temperature to form the hydrophobic solution containing diol and di-isocyanate. The diol and di-isocyanate immediately begin to react together and start the formation of the precursor. Incorporation of short chain water-soluble reactants (especially simple diols) into the precursor inhibits the loss of such reactants into the water phase when the hydrophobic solution is subsequently dispersed in water. It is preferred not to use elevated temperatures and catalysts such as tin alkanoates at this early stage in order to minimise the risk of an excessive degree of reaction which would create a too viscous solution. The hydrophobic solution is next dispersed in water containing ionic and/or non-ionic surfactant and this is preferably done at 18 to 25° C. and before the viscosity of the solution has reached 0.7 to 1 Pascal.sec. Dispersion should be performed under conditions of high shear and possibly using ultra-sonic vibration so as to produce a stable dispersion of droplets having a preferred average diameter of from about 40 to 700 nm and most preferably 40 to 250 nm.

Anionic surfactants introduce carboxylate groups and assist in the formation of a stable dispersion of droplets of a fine particle size whilst non-ionic surfactants assist in the maintenance of a stable dispersion under conditions of high shear and in the presence of metal ions. Preferred anionic surfactants include the sodium salts of di-octyl sulphosuccinate, dodecyl benzene sulphonate, dodecyl sulphate and nonyl phenol ethoxylate sulphonates. Preferred non-ionic surfactants include alkyl ethoxylates, alkyl phenol ethoxylates, and block copolymers of ethylene oxide with propylene oxide and reactive surfactants such as methyl poly(ethylene glycol) methacrylate, alkenyl succinic anhydride condensates or alkoxylated allyl ether. Reactive surfactants can bond with addition polymer domains and so give dispersions of composite particles which have improved colloidal stability under conditions of high shear and in the presence of organic solvents. Possible cationic surfactants include cetyl trimethyl ammonium bromide or amine derivatives of alkyl or alkyl phenol ethoxylates or of block copolymers of ethylene and propylene oxides.

As soon as the droplets are dispersed in water, the rate of co-reaction of diol with di-isocyanate may be safely accelerated. Therefore the droplets can be subjected to temperatures of from 30 to 80° C. (preferably 30 to 50° C.) optionally in the presence of preferably 0.005 to 0.2 wt % of a tin catalyst to provide conditions under which reaction of the diol with the di-isocyanate is promoted so as to accelerate the completion of the formation of the polyurethane prepolymer. Suitable tin catalysts include dibutyl tin dilaureate and dibutyl tin di-acetate. The tin catalysts also catalyse the chain extension by water. Alternative catalysts include tetra butyl titanate and zinc, titanium, zirconium and bismuth carboxylates such as bismuth neodecanoate. It is preferred to add the catalysts to the hydrophobic solution immediately prior to its dispersion into the water/surfactant mixture so as to facilitate the dispersion of the catalysts throughout the dispersed droplets.

The isocyanate groups are capable of reacting both with the hydroxy groups in a diol and with the small amounts of water which diffuse slowly into the dispersed droplets. This gives the composite particles a character somewhat different to that of conventional poly(urethane-urea)/addition polymer composite particles although the difference has so far not been precisely defined. Primary hydroxy groups react faster with isocyanate than does water, so the reaction to complete the formation of the polyurethane prepolymer is favoured. Completion of the prepolymer formation is also further favoured by the slow rate at which the water diffuses into the droplets. Nevertheless, some reaction with water begins and so some chain-extending urea moieties are formed at this stage in the process so improving the distribution of urea moieties leading to better organic solvent resistance and hardness in coatings obtained from the particles.

The isocyanate groups are preferably used in a numerical ratio of from 1.0 to 3.0 to the hydroxy groups of the diols and any polyols. This means that the polyurethane prepolymer tends to be formed with residual isocyanate groups. As the diol hydroxy groups are consumed by the reaction, so the reaction with water faces decreasing competition allowing the water increasingly to chain extend the prepolymer by the formation of urea moieties particularly with residual isocyanate groups. Such chain extension causes cross-linking and/or branching. Chain extension is believed to have the following reaction scheme:

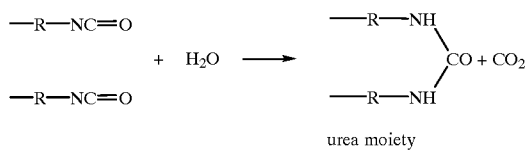

urea moiety

Chain extension by water is in fact preferred to a chain extension with diamine because diamine both over-catalyses the competing water/isocyanate reaction and also promotes flocculation of poly(urethane-urea). Hence the poly(urethane-urea) contains urea moieties as for example suggested above but need not contain diamine residues since no diamine need be used in chain extension. Chain extension of the polyurethane prepolymer produces a poly(urethane-urea) having a weight average molecular weight (Mw) of at least 10 000 (preferably 20 000 to 500 000).

It has been found that the reaction between aromatic di-isocyanates and water is moderated by conducting it in the droplets of hydrophobic solution and that in the absence of the catalysing action of a tertiary amine such as triethylamine, it is presumed that the slow rate at which water diffuses into the droplets is sufficient to make the process of the invention commercially practicable even when performed using aromatic di-isocyanates.

The diols used in the process of this invention may be simple diols such as neopentyl glycol or 1,4 butane diol or polymeric glycols such as poly(ethylene glycol), poly(propylene glycol) or poly(tetramethylene glycol) having number average molecular weights (Mn) of from 200 to 7000 and above, but preferably from 500 to 3000.

The molecular weight of the diol is one of the factors which affects the hardness of a poly(urethane-urea) particle. In general, higher molecular weights produce softer particles which are preferred for use in adhesives. In contrast lower molecular weight diols produce harder particles. So diols containing from 85 to 95 wt % of polymeric diols of over 500 Mn are preferred if the particles are wanted for use in adhesives whereas 5 to 35 (preferably 10 to 20) wt % of simple diols may be preferred if the particles are intended for use in coating compositions for wood, metal, concrete or plastics.

The diols may also be polyesters formed by reacting diols, such as those described above, with dicarboxylic acids such as adipic acid, isophthalic acid, terephthalic acid or fumaric acid or acid anhydrides such as phthalic, maleic or succinic anhydrides. Preferably, the polyesters have number average molecular weights, Mn, of from 200 to 10 000 but with Mn being most preferably between 500 and 3000. The diols may optionally be used in combination with polyols containing three or more hydroxy groups so as to increase the molecular weight of the prepolymer.

The di-isocyanates used in the process are preferably aromatic di-isocyanates optionally used in combinations with mono- or poly-isocyanates where a poly-isocyanate is an isocyanate containing at least three isocyanate groups. Suitable aromatic di-isocyanates include methylene di-p-phenyl di-isocyanate and 2,4 toluene di-isocyanate. Aliphatic isocyanates are more expensive but they may be used to confer increased resistance to ultra violet light.

The process may be modified by varying the choice of isocyanates to adjust the properties of the poly(urethane-urea)/addition polymer composite particles. For example, the molecular weight of the polyurethane prepolymer may be increased by replacing a small proportion (say up to 5 molar %) of the di-isocyanate with poly-isocyanate containing three or more isocyanate groups. Alternatively the molecular weight may be lowered by replacing a small amount (say up to 5 mol %) of the di-isocyanate with a mono-isocyanate. Molecular weight may also be increased by replacing a small amount of the diol with (say up to 5 mol %) of a polyol which contains three or more hydroxy groups.

Other possible modifications include introducing acid moieties into the poly(urethane-urea) in order to improve its adhesion to substrates. This can be done by replacing a small amount (say up to 5 mol %) of the diol with dimethylol propionic acid or with a diol which is a polyester.

The addition polymerisation of ethylenically unsaturated hydrophobic monomer may be performed using any of the conventional free radical techniques used for polymerising acrylate or vinyl ester monomers. Examples of suitable initiators which produce free radicals by thermal decomposition include azo compounds such as 2,2-azobis(isobutyronitrile), persulphates such as ammonium persulphate and peroxides such as hydrogen peroxide, lauryl peroxide or tertiary butyl peroxy (2-ethyl hexanoate). A suitable redox system for creating free radicals is the iron-ascorbic acid-hydrogen peroxide system and this can be used at temperatures of 50° C. or below. Such lower temperatures are preferred to minimise the risk of the reaction overheating. The addition polymerisation of the hydrophobic monomer preferably is performed simultaneously with the reactions involving the iso-cyanate, except that chain extension can continue for some time after the completion of the addition polymerisation.

The preferred ethylenically unsaturated monomers are relatively hydrophobic monomers such as $C_1$ to $C_8$ alkyl esters of acrylic or methacrylic acids, vinyl esters such as vinyl acetate or the so-called vinyl "Versatate"[1], or styrene, all of which are liquid under ambient conditions. Acid moieties can be introduced using liquid monomers such as acrylic or methacrylic acids or solid acid anhydrides such as maleic or succinic anhydrides provided that the anhydrides are soluble in the liquid monomers. An addition copolymers can be given an appropriate glass transition temperature (Tg) by choosing a combination of monomers, some of which, if homopolymerised, would give polymers having a high Tg whilst the others would give polymers of low Tg. For example by choosing a monomer whose homopolymer has a Tg of below 310K and one whose homopolymer has a Tg above 330K, it is possible to provide a copolymer of Tg 270 to 340K which is therefore conveniently soft at ambient temperatures. Alternatively, by increasing the amount of monomer whose homopolymer has a high Tg, a copolymer is obtained which is useful for application at higher temperatures employed in industrial coating or bonding processes. Immiscibility with water is an important characteristic of the hydrophobic monomers used as solvents. Higher ratios of poly(urethane-urea) to addition polymer can be achieved by replacing a proportion of the addition polymerisable monomer with inert hydrophobic organic solvent, but at a cost of having to remove the inert solvent before the dispersions aqueous composite particles can be used in fully environmentally friendly coating compositions.

A possible modification to the addition polymerisation process provides a more positive bond between addition polymer domains and the poly(urethane-urea). The modification comprises replacing a small amount (say up to 5 mol %) of the addition polymerisable hydrophobic monomer with hydroxy alkyl (meth)acrylate monomer. The hydroxy alkyl monomer copolymerises into the addition polymer particle providing hydroxy groups which tend to migrate towards the surface of a composite particle owing to their more hydrophilic nature. The hydroxy groups are therefore available to form urethane bonds to the polyurethane prepolymer which serve to create a very positive link between the poly(urethane-urea) outer regions of the composite particles and their addition polymer inner regions. Such bonding can improve the abrasion and scratch resistance of dried compositions containing composite particles.

A further possible modification to an addition polymerisation process results in the formation of smaller domains of addition polymer. The smaller domains have the advantage that when aqueous dispersions of the composite particles are used to form coatings, the dried coatings obtained are much clearer, that is to say they are less translucent and more transparent. The modification comprises replacing a small amount (say from 0.1 to 2.5 mol %) of the addition polymerisable hydrophobic monomer with a crosslinkable monomer. The most convenient crosslinkable monomers contain ethylenic polyunsaturation. Preferred di-unsaturated monomers include diethylene glycol dimethacrylate, butane diol diacrylate, hexane diol diacrylate, allyl methacrylate and diallyl phthalate. Preferred tri-unsaturated monomers include trimethylolpropane triacrylate, glycerol triacrylate and pentaerythritol triallyl ether.

It is not fully understood why crosslinkable monomers should have such a beneficial effect on clarity, but it is possible that crosslinking reduces the mobility of the growing chains of addition polymer and/or entraps some poly (urethane-urea). Both these effects could inhibit the growth of the domains. It is therefore possible that a composite particle might contain a plurality of domains of addition polymer at least partially surrounded by poly(urethane-urea) and with the further possibility of some of the poly (urethane-urea) being present within a domain. Such a polydomain structure is an alternative to the more common simple core-shell structure in which the composite particle comprises a single domain or "core" of addition polymer around which is located an at least partial "shell" of poly (urethane-urea).

The poly(urethane-urea)/addition polymer composite particles obtained by the process of this invention preferably have nanosized particle sizes of from 40 to 700 nm and they may especially be nanosized particles having particle sizes of from 40 to 250 nm. The particles can be obtained as aqueous dispersions in water containing no significant amounts of residual organic solvent (i.e. at least less than 3 wt % and preferably substantially 0 wt %). Therefore the dispersions are especially useful in environmentally sensitive applications. The aqueous dispersions may contain over 40 wt % of particles (based on the total weight of the dispersion) and particle contents as high as between 45 to 50 wt % are preferred.

Aqueous dispersions of composite particles made according to the process of this invention may be added to aqueous coating compositions and adhesives formulations in order to improve the abrasion, scratch and solvent resistances of the dried coatings and the adhesive and solvent-resistant properties of dried adhesives formulations. They are particularly useful in coating compositions for architectural surfaces such as walls, ceilings, door and window frames and particularly for floors. More generally, they are useful in coating compositions for wood, metal, concrete, glass fiber and plastics provided that the plastics surface has sufficient polar characteristics. They are also useful in coating compositions for motor vehicles and metal cans. The coating compositions may also contain conventional additives such as pigments, dyes, extenders, thickeners and biocides. For applications where the less offensive organic coalescing solvents can be tolerated, the quality of the dried films formed can be improved by adding conventional coalescing solvents such as 2,2,4'-trimethyl-1,3-pentanediol monoisobutyrate or 1-methoxy-2-hydroxy propane. Preferably the amount of coalescing solvent should be from 1 to 15 wt % of the coating composition.

The invention is further illustrated by the following Examples.

EXAMPLE 1

Production of Hard Poly(urethane-urea)/Addition Polymer Composite Particles for a Coating Composition for Wood The amounts of the various reactants used are shown in Table 1.

A mixture of ethylenically unsaturated addition polymerisable hydrophobic monomers which were methyl methacrylate, butyl acrylate and styrene was charged to a round bottom flask at room temperature. Neopentyl glycol (a simple diol) and a polyester diol which was a polyester of neopentyl glycol and butane diol with adipic acid having a number average molecular weight of about 1000 were stirred into the monomer mixture to produce a homogenous solution of diols in a hydrophobic monomer mixture. Then, a mixture of 4,4' and 2,4' methylene di-phenyl di-isocyanate was stirred into the hydrophobic monomer mixture, where it too dissolved. The diol began to co-react with the di-isocyanate and start formation of a solution in the hydrophobic monomer mixture of a precursor for the eventual polyurethane prepolymer. The viscosity of the contents of the flask was kept below 1 Pascal.sec when measured at 18° C.

After about only 5 minutes and well before completion of the co-reaction of diol and di-isocyanate, de-mineralised water containing an anionic surfactant which was sodium di-octyl sulphosuccinate was slowly added to the contents of the flask under conditions of high shear agitation imparted by a Silverson homogeniser. Silverson homogenisers are supplied by Silverson Machine Limited of Chesham, England. A dispersion of fine droplets of the hydrophobic monomer mixture solution was obtained which was then subjected to further dispersion using a Branson ultrasonic homogeniser for 4 minutes. Branson homogenisers are supplied by Branson Ultrasonics of Danbury, Conn., USA. The final dispersion obtained contained nanosized droplets of hydrophobic monomer mixture solution having a "z" average diameter of 200 nm as determined by photocorrelation spectroscopy.

The aqueous dispersion of nanosize droplets was transferred to a 2 liter vessel where it was stirred and maintained under a nitrogen atmosphere whilst the co-reaction of the diol and di-isocyanate continued, converting precursor into prepolymer. Water slowly diffused into the nanosized droplets whereupon a slow chain extension began and led to the formation of poly(urethane-urea) particles.

The temperature of dispersion was raised to 80° C. and tertiary butyl peroxy (2-ethyl hexanoate) free radical initiator was added to initiate an addition copolymerisation of the hydrophobic monomers which was continued for 3 hours at 80° C. Then the addition copolymerisation was completed by adding a further small amount of the initiator together with some ascorbic acid and continuing the heating for a further 45 minutes.

After standing overnight, it was found that over 95% of the isocyanate groups had reacted to produce poly(urethane-urea) located as an outer shell around a methylmethacrylate/butyl acrylate/styrene addition copolymer inner core. The nanosized core/shell composite particles so produced had a "z" average particle size of 188 nm and comprised 50 wt % of addition copolymer core and 50 wt % of poly(urethane-urea) shell. The particles were obtained in an aqueous dispersion containing 41.8 wt % composite particles and less than 0.1 wt % of residual organic solvent. The particles were found to have a notional acid value of 11.5 mg KOH/g of the poly(urethane-urea) content of the composite particles.

TABLE 1

Reactants used in Example 1

| Reactant | Wt used g |
| --- | --- |
| Methyl methacrylate | 65.0 |
| Butyl acrylate | 41.2 |
| Styrene | 110.6 |
| Neopentyl glycol | 19.4 |
| Neopentyl glycol/butane diol/adipate (mol.wt. 1000) | 93.6 |
| Methylene di-phenyl di-isocyanate | 105.2 |
| De-mineralised water | 533.9 |
| Anionic Surfactant: Sodium di-octyl sulphosuccinate | 14.0 |
| T. butyl peroxy (2-ethyl hexanoate) | |
| First addition | 4.3 |
| Second addition | 2.1 |
| Ascorbic acid as 5 wt % sol$^n$ in water | 10.7 |
| Total | 1000.0 |

In a modification of the above procedure, 0.01 g of dibutyl tin dilaureate was added as a catalyst for the chain extension reaction and as a result, poly(urethane-urea) formation and chain extension were substantially complete after 2 hours.

A sample of the aqueous dispersion of composite particles made according to this Example was mixed with 10% of its weight of a coalescing co-solvent which was 1-methoxy-2-hydroxy propane. The mixture was applied to a glass surface using a 200 μm block spreader, dried at 120° C. for 30 minutes, allowed to cool to ambient (18° C.) temperature and then stood at that temperature for 24 hours. The dried coating was then subjected to the Erichsen Pendulum hardness test which correlates hardness directly with the time taken to dampen fully the swing of the pendulum. The dried coating took a time to dampen the pendulum which was comparable with the time taken by a corresponding coating made according to the prior art.

EXAMPLE 2

Use of Alternative Diols:

Example 1 was repeated, but using the reactants shown in Table 2 so as to illustrate the suitability of alternative diols.

The aqueous dispersion obtained contained composite particles having a z-average particle size of 209 nm and was still stable after 5 minutes of a shear of 10000/sec imparted by an ICI Cone and Plate viscometer. The dispersion could be drawn down to a thickness of 200 μm whereupon it dried to give a clear film of good flexibility having an Erichson hardness of 80 seconds after 7 days.

TABLE 2

Reactants used in Example 2

| Reactant | Wt used g |
| --- | --- |
| Methyl methacrylate | 66.4 |
| Butyl acrylate | 42.1 |
| Styrene | 112.9 |
| $^1$"Pripol" 2033 | 71.8 |
| Neopentyl glycol/$^2$DMPA/adipate (mol.wt. 1000) | 62.1 |
| Methylene di-phenyl di-isocyanate | 69.7 |
| De-mineralised water | 543.2 |
| Anionic Surfactant: sodium di-octyl sulphosuccinate | 14.3 |
| T. butyl peroxy (2-ethyl hexanoate) | |
| First addition | 4.4 |
| Second addition | 2.2 |
| Ascorbic acid as 5 wt % sol$^n$ in water | 10.9 |
| Total | 1000.0 |

$^1$"Pripol" 2033 is the dimer diol obtained from a mixture of $C_{36}$ branched chain fatty acids and is supplied by Uniqema BV of Gouda in the Netherlands.
$^2$DMPA is dimethylol propionic acid in a polyester derived from 55.5 wt % neopentyl gycol, 11.6 wt % DMPA and 52.2 wt % adipic acid.

EXAMPLE 3

Use of Polypropoxylate as a Diol:

Example 2 was repeated except that the reactants used were as shown in Table 3 and in particular they show a change to a non-ionic surfactant and a redox initiator system. The first mop-up addition of initiator was made 30 minutes after the first addition of initiator and the second and third mop-up additions were likewise made after further intervals of intervals of 30 minutes each.

An aqueous dispersion of composite particles was obtained which was very similar to that of Example 2 except that the particles had a z average particle size of 217 nm. The dispersion gave a similarly hard dried film. The dispersion showed promise as a size for glass fibers.

TABLE 3

Reactants used in Example 3

| Reactant | Wt used g |
| --- | --- |
| Butyl acrylate | 58.7 |
| Styrene | 81.7 |
| Polypropoxylate (Mol Wt 2000) | 56.2 |
| Neopentyl glycol | 11.7 |
| Methylene di-phenyl di-isocyanate | 112.4 |
| De-mineralised water | 323.7 |
| Non-ionic Surfactant: "Synperonic" F88 | 14.0 |
| Redox Iniator: | |
| Oxidant | |
| Hydrogen peroxide (10% solution) | 16.5 |
| Demineralised water | 18.1 |
| Reductant | |
| Ascorbic acid (5% solution) | 18.8 |
| Demineralised water | 18.1 |

TABLE 3-continued

Reactants used in Example 3

| Reactant | Wt used g |
|---|---|
| Mop-up Initiator (1) | |
| Hydrogen peroxide (10% solution) | 3.2 |
| Ascorbic acid (5% solution) | 3.5 |
| Mop-up Initiator (2) | |
| Hydrogen peroxide (10% solution) | 3.2 |
| Ascorbic acid (5% solution) | 3.5 |
| Mop-up Initiator (3) | |
| Hydrogen peroxide (10% solution) | 3.2 |
| Ascorbic acid (5% solution) | 3.5 |
| Total | 750.0 |

The drawings which accompany this specification illustrate possible reaction schemes used in existing processes.

Figure 1:
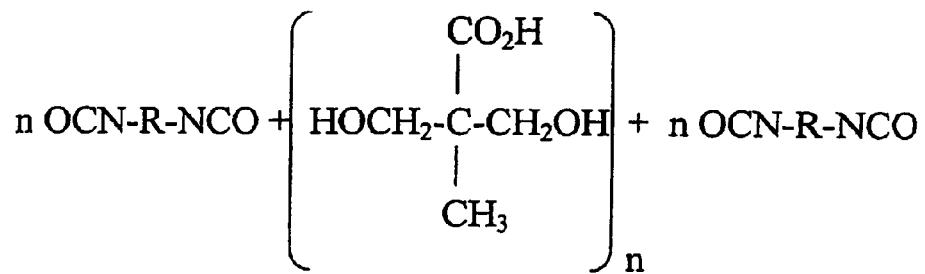
FIG. 1 shows a reaction scheme for the formation of a conventional polyurethane prepolymer.
Figure 1:
Figure 1:
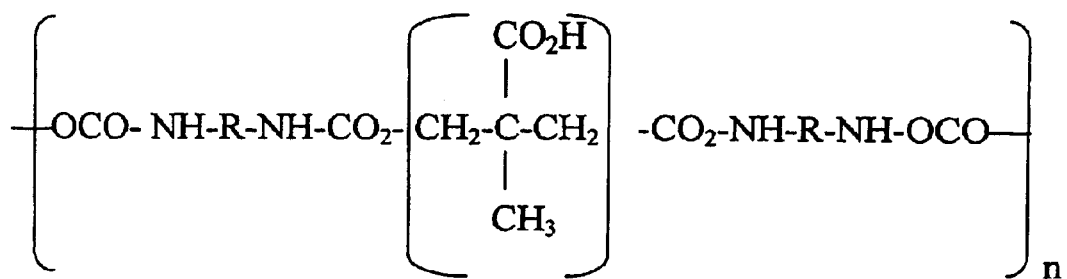
Figure 2:
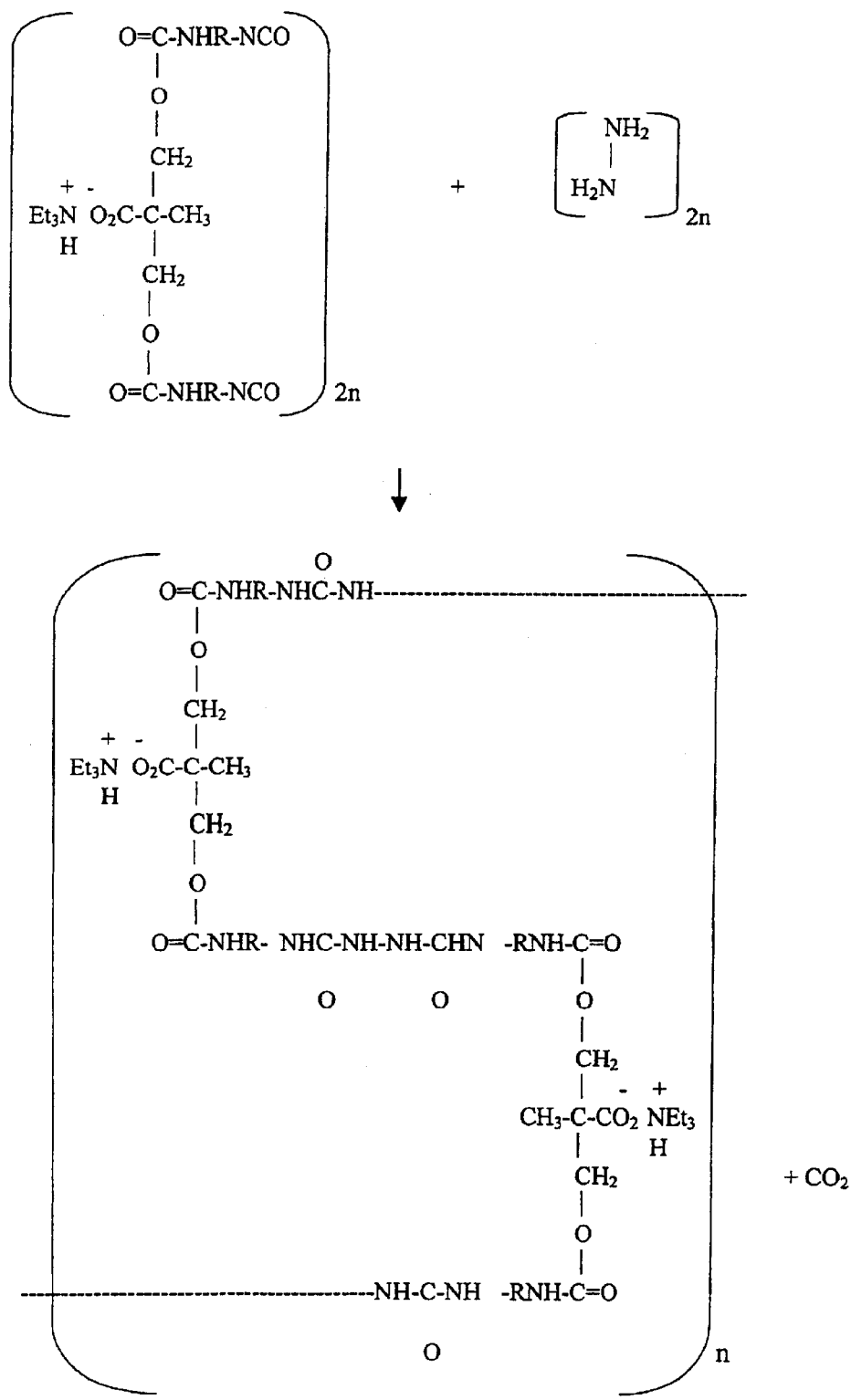
FIG. 2 shows a reaction scheme for the chain extension by hydrazine of the prepolymer shown in FIG. 1.

What is claimed is:

1. A process for making poly(urethane-urea)/addition polymer composite particles which may optionally carry some ionic carboxylate groups, which process involves
   a) dissolving diol and di-isocyanate in addition polymerisable hydrophobic monomer to form a hydrophobic solution in which the diol and di-isocyanate begin to co-react,
   b) dispersing the hydrophobic solution in water containing surfactant so as to form a dispersion of droplets of the hydrophobic solution in the water,
   c) forming polyurethane-urea by chain extension of a prepolymer which has been formed by co-reaction of the diol and the di-isocyanate,
   d) subjecting the dispersed droplets of the hydrophobic solution to an addition polymerisation in which the additon polymerisable monomers polymerise to form domains of addition polymer around which poly(urethane-urea) spontaneously locates wherein the process also includes
   e) dispersing the hydrophobic solution in water before completion of the co-reaction of diol and di-isocyanate whereby there is formed in the hydrophobic monomer prior to dispersion only a precursor for the prepolymer which precursor has a molecular weight lower than that of the prepolymer,
   f) continuing the co-reaction of diol and di-isocyanate in the dispersed droplets of the hydrophobic solution so as to convert precursor to prepolymer and
   g) allowing water to diffuse spontaneously into the dispersed droplets whereupon chain extension occurs producing poly(urethane-urea)

whereby there is obtained a stable aqueous dispersion of the polyurethane-urea/addition polymer particles having a notional acid value of less than 30 mg KOH/g poly(urethane-urea) content of the composite particles.

2. A process according to claim 1 wherein the hydrophobic solution is dispersed in the water before the weight average molecular weight of the solution has become more than 80% of the weight average molecular weight of the prepolymer.

3. A process according to claim 1 wherein the hydrophobic solution is dispersed in the water before the viscosity of the solution exceeds 1 Pascal·sec if measured at 18° C.

4. A process according to claim 1 wherein the hydrophobic monomer solution is dispersed in the water under conditions of shear so high as to create nanosized droplets of monomer solution having a number average diameter of from 40 to 400 nm.

5. A process according to claim 1 wherein the diol is dissolved in the hydrophobic solvent before the di-isocyanate.

6. A process according to claim 1 wherein the di-isocyanate is an aromatic di-isocyanate.

7. A process according to claim 1 wherein up to 5 mol % of the addition polymerisable monomer is hydroxyalkyl (meth)acrylate monomer.

8. A process according to claim 1 wherein up to 2.5 mol % addition polymerisable monomer is crosslinkable monomer.

9. An aqueous dispersion wherein the dispersion comprises composite particles made according to claim 1.

10. An aqueous dispersion according to claim 9 wherein the dispersion contains less than 3 wt % of organic solvent.

11. An aqueous dispersion as claimed in claim 9 wherein the dispersion contains over 40 wt % of the composite particles.

12. An aqueous coating composition wherein the composition contains composite particles made by a process according to claim 1.

13. An aqueous adhesives formulation wherein the formulation contains composite particles made by a process according to claim 1.

14. A wooden, metal, concrete, glass fiber or plastics substrate whenever coated with a film formed at least in part from composite particles made by a process according to claim 1.

* * * * *